United States Patent [19]

Schjeldahl

[11] 4,319,952
[45] Mar. 16, 1982

[54] RECIPROCALLY MOVING HOT-WIRE FOR BAG MAKING MACHINE

[76] Inventor: Gilmore T. Schjeldahl, 4436 Marlborough Ct., Minnetonka, Minn. 55343

[21] Appl. No.: 220,761

[22] Filed: Dec. 29, 1980

[51] Int. Cl.³ .......................... B32B 31/00; B29D 7/06
[52] U.S. Cl. ..................................... 156/510; 156/515
[58] Field of Search ................................ 156/510, 515

[56] References Cited

U.S. PATENT DOCUMENTS

| | | | |
|---|---|---|---|
| 3,748,205 | 7/1973 | Adams | 156/515 |
| 3,776,804 | 12/1973 | Monahan et al. | 156/515 |
| 4,029,539 | 6/1977 | Doll | 156/515 |
| 4,101,369 | 7/1978 | Adams | 156/510 |
| 4,268,346 | 5/1981 | Achelpohl | 156/510 |

Primary Examiner—William J. Van Balen
Attorney, Agent, or Firm—Orrin M. Haugen; Thomas J. Nikolai

[57] ABSTRACT

A hot-wire type cutting machine for severing a continuous web of thermoplastic sheet material into individual segments. The web is arranged to be advanced, step-by-step, and while stationary, the hot-wire is made to pass progressively through the web from one side edge thereof to the other and then, the web is indexed another step. During the next cutting stroke of the hot-wire through the web, the same portion of the wire first contacting the web on the previous cutting stroke is the first to contact the web on the second cutting stroke.

7 Claims, 11 Drawing Figures

RECIPROCALLY MOVING HOT-WIRE FOR BAG MAKING MACHINE

BACKGROUND OF THE INVENTION

I. Field of the Invention

This invention relates generally to apparatus for cutting through webs of thin, flexible thermoplastic sheet material and more specifically to an improved cutting arrangement for use in a machine for fabricating plastic bags and the like.

II. Discussion of the Prior Art

In plastic bag making machinery and in other packaging machinery, a need exists for cutting apparatus which may be brought into play to sever superposed webs of thermoplastic sheet material into discrete segments while at the same time creating a fused weld between the superposed sheets along the length of the cut. Many such machines have used a relatively heavy heated blade which is brought into contact with the thermoplastic sheet material in such a fashion that the material is compressed causing a nearly complete separation of the web. A secondary step follows to pull the web apart, thus leaving an edge seal on the trailing edge of the separated part and a similar seal on the leading edge of the webs. These blades tend to be relatively heavy requiring considerable force to accelerate and decelerate them during their cutting stroke. This generally puts a considerable strain on the machine parts employed to move the massive blade in a reciprocating fashion relative to the web of sheet material being cut. It also requires an inordinate amount of time to manipulate the blade between successive strokes which reduces the production rate of the machine.

One prior art approach which has been used to obviate certain of the problems associated with reciprocally moving a massive blade is the use of a hot-wire type cutting implement. Such a hot-wire is generally resistively heated by passing a predetermined current through the wire. Being made from relatively fine wire, they are light in weight and are more readily manipulated in their cutting stroke because of their substantially lower inertia. However, because such hot-wires are fabricated from relatively fine wire, their heat capacity tends to be quite low. As such, when the hot-wire is forced against the thermoplastic sheet material to be cut, there is a tendency of the mass of plastic material to draw heat from the wire causing it to cool. Hence, the next cutting stroke must be delayed until the wire again reaches a predetermined temperature suitable for the cutting operation. The delay introduced between each cutting stroke necessarily reduces the throughput of the machine on which it is used.

Where cooling of the hot-wire is a limiting factor on the rate at which cuts may be made, it might appear that the obvious remedy would be to increase the current in the current flow and therefore the temperature of the wire. However, as those skilled in the packaging and bag making machinery art know, there is a practical limit to the temperature which may be used in cutting thermoplastic sheet material with a hot-wire, especially where it is desired that the portion of the film being cut through create a fusion bond with a superposed sheet. If the hot-wire temperature is too high, the thermoplastic material will effectively vaporize and will fail to create a fused seam or seal. Furthermore, the cutting wire will have a relatively short life when made to operate at inordinately high temperatures.

The present invention obviates the problems of prior art hot-wire cutting apparatus used in bag making machinery and related equipment. In accordance with the present invention, the hot-wire is made to progressively move through the superposed webs to be cut from one side edge thereof to the other in such a fashion that the point of contact between the hot-wire and the surface being cut moves across the length of the hot-wire during the cutting stroke. Furthermore, the opposed ends of the hot-wire are manipulated such that on a return cutting stroke following the indexing of the web material, the portion of the hot-wire which first came in contact with the web during the preceding cutting stroke again is the first to contact the web during the next cutting stroke. As a result, the points of the wire again begin to re-heat following their contact with the web material, and by the time that the first cut has been completed and the web of thermoplastic sheet material has been stepped to its next position, the point of the wire first to contact the web will again have reached its appropriate temperature for ensuring simultaneous cutting and sealing.

SUMMARY OF THE INVENTION

In carrying out the invention, there is provided a machine for forming bags or the like from thermoplastic film. As in prior art machines, it includes a supply roll containing a continuous web of thermoplastic film with two superposed layers. This sheet material is periodically drawn off from the supply reel in step-by-step fashion and passed between two transversely extending tacking members which, when brought into play, form a tacked or bonded zone of a predetermined width between the superposed layers of sheet material. Located downstream from the apparatus for forming the temporary bonding zone is a hot-wire type cutting tool which is arranged to make a transverse cut through the approximate center of the bond zone already formed. The cutting tool comprises first and second reciprocally movable support members which are generally aligned with one another on opposite sides of the film path and extending between these support members is the hot-wire element itself. Cooperating with the support members is a device which causes the support members to move up and down reciprocally in a predetermined phase relationship such that the hot-wire is progressively passed through the bond zones from one side edge of the film layers to the other. The phase relationship is also such that the portion of the hot-wire which first came into contact with the layers during a passage through one bond zone will again be the first portion to come into contact with the layers during the passage of the hot-wire through the next adjacent bond zone. In this fashion, the segments of the wire along its length which have been in contact with the film layers while passing through them are allowed a maximum time for re-heating without introducing extra delay into the cycle for this purpose.

OBJECTS

It is accordingly a principal object of the present invention to provide improved apparatus for cutting through one or more superposed layers of thermoplastic film.

Another object of the invention is to provide an improved apparatus for cutting through multiple layers of superposed thermoplastic film whereby the edges of the individual layers, following cutting, are fused together.

Still another object of the invention is to provide in an automatic plastic bag forming machine a hot-wire type cutting assembly which, when made to pass through superposed layers of thermoplastic film material, results in a welding of the edges of the layers together.

A still further object of the invention in conjunction with the immediately foregoing object is to provide a hot-wire cutting assembly which allows the overall rate of production of thermoplastic bags to be increased over that which can be attained with known prior art machines designed for the same purpose.

Yet still another object of the invention is to provide a hot-wire cutting assembly in a thermoplastic bag forming machine which is arranged to cut transversely through plural webs of superposed thermoplastic sheet material in a predetermined programmed manner such that the point of contact between the hot-wire and the film being severed is given a maximum time to re-heat following a first cutting cycle, thereby obviating the need to lengthen the normal dwell time of the machine.

These and other objects and advantages of the invention will become apparent to those skilled in the art from the following detailed description of a preferred embodiment when considered in conjunction with the accompanying drawings in which like numerals in the several views refer to corresponding parts.

DESCRIPTION OF THE PREFERRED EMBODIMENT

Figure 1:
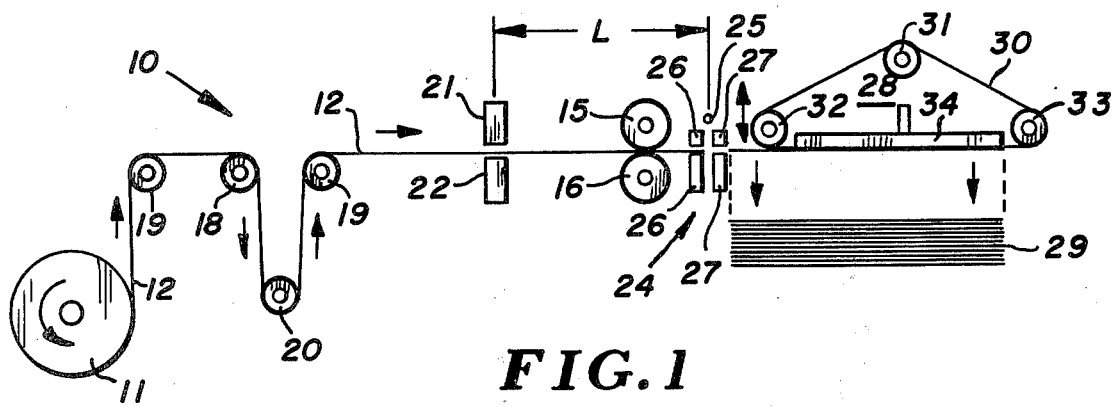
FIG. 1 is a mechanical schematic diagram of a plastic bag making machine in which the present invention finds use.

Certain terminology will be used in the following description for convenience and reference only and will not be limiting. The words "upwardly", "downwardly", "rightwardly" and "leftwardly" refer to directions in the drawings to which reference is made. The words "inwardly" and "outwardly" will refer to directions toward and away from, respectively, the geometric center of the device and associated parts thereof. This terminology will include the words above specifically mentioned, derivatives thereof, and words of similar import.

Referring, then, to FIG. 1, there is indicated generally by numeral 10 a mechanical schematic diagram of a machine for fabricating plastic bags from thermoplastic sheet material. The machine includes a supply roll 11 of thermoplastic film material in web form, the web preferably being longitudinally folded about a center line so that the web 12 played out therefrom comprises at least two superposed layers of film joined along one edge. The same result may be achieved by bonding two superposed layers along one edge. These layers are identified by numerals 13 and 14 in the fragmentary view of FIG. 2. Predetermined lengths of the web are withdrawn from the supply roll 11 by means of intermittently operated draw rollers 15 and 16, the web being passed about and around guide rollers 17, 18 and 19 and a tensioning roller 20.

The structure thus far described is entirely conventional in bag making machinery and is described solely for illustrating the environment in which the apparatus of the present invention finds use. For example, the intermittent drive mechanism for withdrawing the film web and moving it intermittently may be like that described in U.S. Pat. Nos. 3,776,804 and 4,101,369 which are hereby incorporated by reference herein.

Disposed between the guide roller 19 and the draw rolls 15 and 16 is a tacking or heat setting station comprised of an upper heater bar 21 and a lower heater bar 22 disposed above and below the superposed layers of film material and extending in a transverse direction relative to the path of travel of the web. These bars are arranged to be opened and closed in a reciprocating fashion relative to the web and are heated to a temperature sufficient to tack the superposed webs together along a fixed interface as identified by numeral 23 in FIG. 2. The temperature is insufficient to melt and fuse the layers 13 and 14 together, but, as mentioned, is sufficient to effect a tacking or bonding of the layers. The transversely extending heater bars 21 and 22, then, create a bond zone which extends the full width of the web.

Disposed downstream of the intermittently operated draw rolls 15 and 16 is the web cutting station indicated generally by numeral 24. Located at the cutting station is a hot-wire type knife 25 and a pair of clamps 26—26 and 27—27 disposed in pairs on either side of the hot-wire 25. Both the clamps and the hot-wire extend transverse to the direction of travel of the web and extend the full width thereof. When the web 12 is at rest during its intermittent travel, the clamps 26—26 and 27—27 are moved into a gripping relationship with respect to the web and the hot-wire 25 is made to pass through the space between the clamps and through the web to effect a cutting thereof.

Upon each operation of the intermittent drive, the web is stepped the distance, L, corresponding to the spacing between the tacking bars 21–22 and the hot-wire 25. Thus, the hot-wire 25 is made to pass through the bonding zone earlier established by the heater bars 21–22. The hot-wire is maintained at a temperature which is sufficient to melt and fuse the plastic material in the zone of the cut as indicated in the cross-sectional view of FIG. 3.

In that the present invention is primarily concerned with the manner in which the hot-wire knife is manipulated during its cutting stroke, more will be said about that structure hereinbelow. Suffice it to say for now, the passage of the hot-wire 25 through the bonding zone results in a severing of the web and a simultaneous formation of a fused weld of the thermoplastic material on both sides of the hot-wire 25.

Following the cutting step, the clamps 26—26 and 27—27 are released and a conveyor, indicated generally by numeral 28, is used to transport the severed bag segments to a stacking station 29. While various forms of conveyors may be used, it is found expedient to utilize a perforated endless belt 30 which is adapted to be driven by a drive roller 31 in synchronism with the movement of the draw rolls 15 and 16. The endless belt 30 is also routed about guide rollers 32 and 33 so as to create a generally horizontal flight therebetween. Superposed over the perforated belt 30 in the area of the horizontal flight is a vacuum box 34 which may be alternately evacuated and pressurized by means of a suitable air supply and vacuum source (not shown).

Figure 2:
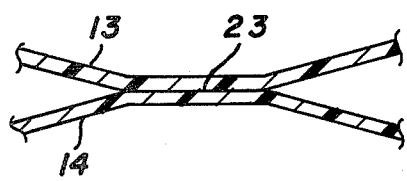
FIG. 2 is a partial side elevation of the superposed web material after passing through the tacking station in FIG. 1.

Reviewing briefly the overall operation of the system of FIG. 1, the longitudinally folded web 12 is moved step-by-step from the supply roll 11, past the tacking bars 21-22 and through the cutting station 24 by the action of the intermittently operated draw rolls 15 and 16. As the end of the web projects through the downstream clamp 27—27, a vacuum is applied to the vacuum box 34 causing the web to adhere to the undersurface of the perforated belt 30. Next, the heater bars 21 and 22 close upon the web to form a temporary tacking as indicated in FIG. 2 of the drawings and at the same time the clamp members 26—26 and 27—27 close upon the web to firmly grip the thermoplastic material as the hot-wire knife 25 is made to pass through it. Following the cutting stroke, the heater bars 21-22 and the clamp members 26 and 27 are released and the driver roller 31 is again made to move in synchronism with the draw rolls to move the severed segments of the web to the stacking station 29. At this point, a positive pressure is applied to the vacuum box 34 causing the bag to be released from the undersurface of the conveyor belt 30.

Now that the overall system in which the present invention finds use has been set out in detail, consideration will be given to the novel structure for manipulating the movement of the hot-wire 25 during its cutting stroke whereby the objects and advantages already mentioned in the introductory portion of this specification are achieved.

Figure 4:
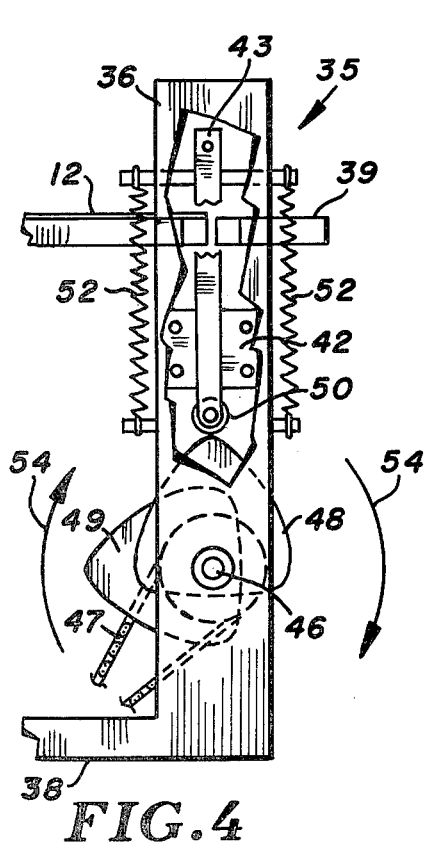
FIG. 4 is a side elevation of the hot-wire cutting apparatus of the present invention during a first instant of its cutting cycle.
Figure 5:
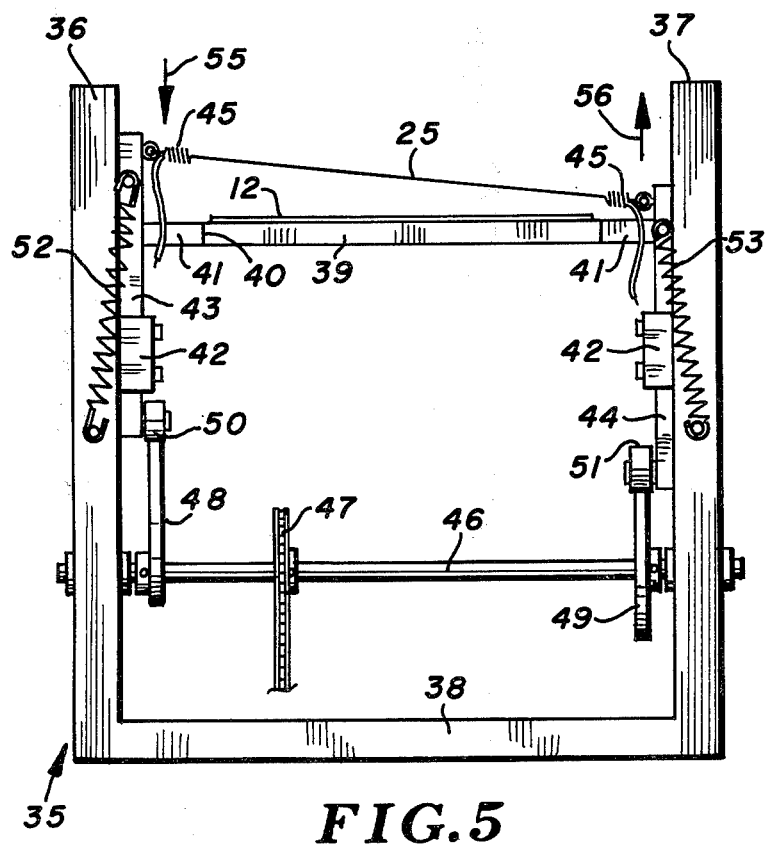
FIG. 5 is a front elevation of the apparatus of FIG. 4.

Referring first to FIGS. 4 and 5, there is shown a frame member 35 having first and second parallel, spaced apart, upwardly extending legs 36 and 37 coupled together at their lower ends by a cross member 38. The spacing between the legs 36 and 37 is such that the film web to be cut may pass between them. More specifically, extending generally horizontally between the legs 36 and 37 and proximate the upper ends thereof is a platform 39 having a slot 40 of a width slightly greater than the diameter of the hot-wire 25 formed therethrough. In FIG. 5, the slot extends between two generally rectangular apertures 41 formed in the opposed side edges of the platform surface 39.

Mounted on the inside surfaces of the frame legs 36 and 37 are guide blocks 42 which are bolted in place and which are machined to contain a guide slot for slidingly receiving cam follower shafts 43 and 44. Attached to the upper portion of the cam follower shafts 43 and 44 and extending between them is the resistance heated hot-wire 25. Suitable means, such as springs 45, may be used to maintain a relatively constant tension on the wire 25, irrespective of length variations which may be caused by temperature changes. As is illustrated, the rectangular apertures 41 permit not only the ends of the cam follower shafts 43 and 44 to pass through the platform but also the wire tensioning means 45.

A cam shaft 46 extends between the legs 36 and 37 of the frame and is journaled for rotation therein. A sprocket wheel 47 is secured to this shaft. The sprocket wheel 47 may be coupled by a suitable notched timing belt or by a chain to a source of rotational power, preferably the drive means used to supply motive power to the remaining parts of the bag making machine. Also secured to the cam shaft 46 are cams 48 and 49. When the frame assembly is appropriately mounted relative to the path of the intermittently movable web 12 as viewed in FIG. 1, the cam 48 will be referred to as the "near side" cam, while the cam 49 will be referred to as the "far side" cam.

Secured to the lower end of the cam follower shaft 43 is a roller-type cam follower 50. Similarly, the cam follower shaft 44 has a cam follower roller 51 rotationally mounted at the lower end thereof. Tension springs 52 are coupled between the frame and the cam follower shaft 43 so as to normally urge the cam follower 50 against the profile of the near side cam 48. Likewise, tension springs 53 are coupled between the cam follower shaft 44 and the frame leg 37 so as to normally urge the cam follower roller 51 against the periphery of the far side cam 49.

Referring to FIG. 4, it can be seen that the cams 48 and 49 are somewhat triangular in shape but have generally rounded vertices to ensure a smooth transition. The cams are eccentrically mounted on the shaft 46 as illustrated. It is to be further noted that the near side cam 48 and the far side cam 49 are offset with respect to one another by 90°. That is to say, the maximum throw of the near side cam 48 leads that of the far side cam 49 by 90°. With respect to FIGS. 4 and 5, then, the shaft 46 may be considered to be in its 0° position. In this position, the follower shaft 43 is at the extreme uppermost point in its travel. A continued rotation of this shaft in the direction indicated by the arrows 54 results in a lowering of the follower shaft 43 and, accordingly, of the leftmost end of the hot-wire 25 as viewed in FIG. 5. At this same time, the far side cam 49 is at a position where it is on the rising portion of the cam 49 such that the rightmost end of the hot-wire 25 is ascending. The small arrows 55 and 56 show the direction of travel of the leftmost and rightmost ends of the hot-wire 25, respectively, during the rotation of the shaft from 0° to 90°.

Figure 6:
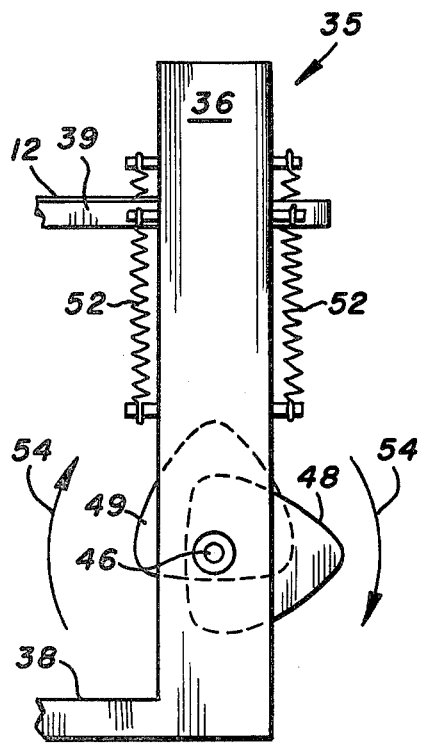
FIG. 6 is a side elevation of the wire cutting apparatus at a slightly later time in the cycle.

FIG. 6 illustrates the orientation of the cams, cam followers and hot-wire when the shaft has moved to its 90° position. Here, the near side follower shaft 43 is continuing in its downward movement as the cam 48 continues to rotate. The follower shaft 44 has just reached its furthest excursion in the upward direction and will be moving downward upon continued rotation of the shaft in the direction indicated by the arrows 54. Again, the arrows 57 and 58 indicate the direction of travel of the respective ends of the hot-wire 25 as the cam shaft 46 rotates between its 90° position to its 180° position.

Figure 7:
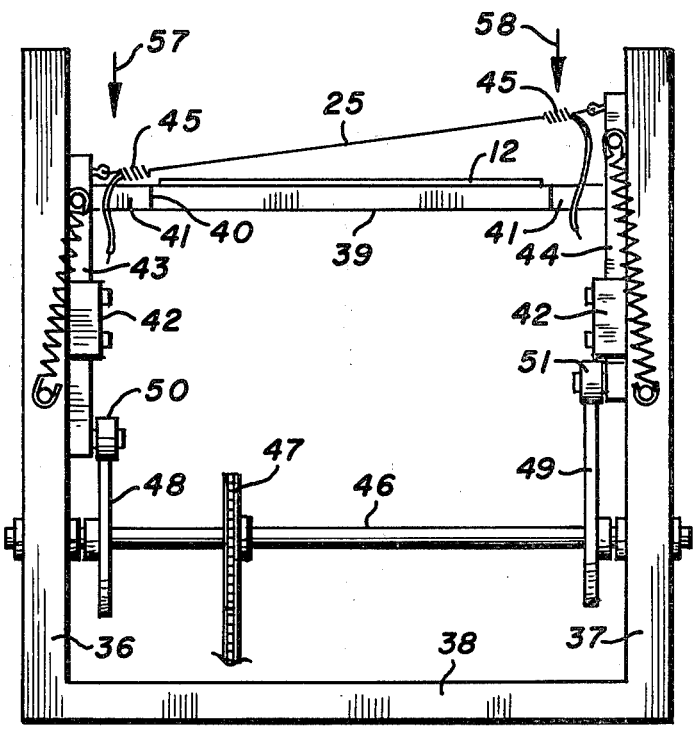
FIG. 7 is a front elevation of the apparatus of FIG. 6.

As the shaft 46 rotates between the 90° and 180° positions, the leftmost end of the hot-wire (when viewed in FIG. 7) will come into contact with the film layer 12 which spans the slot 40 formed in the platform 39. In that the wire is at an angle with respect to the plane of the web to be cut, the wire will move progressively through the web from one side edge thereof to the other and the instantaneous point of intersection of the wire with the plane of the web will move along the length of the wire 25.

Figure 8:
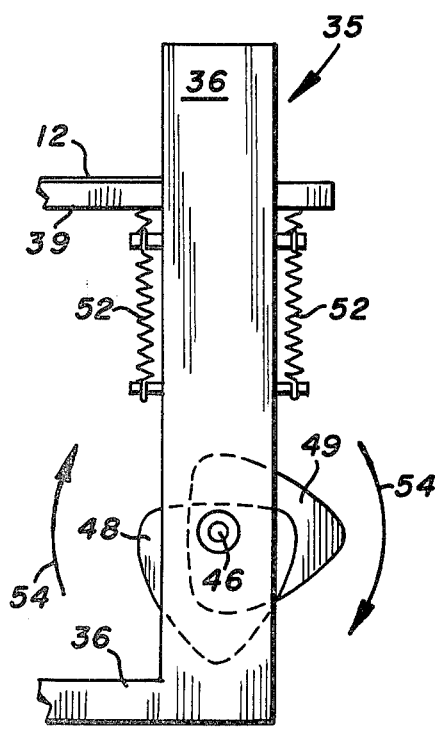
FIG. 8 is a side elevation of the hot-wire cutting apparatus at a yet later time in its cycle of operation.
Figure 9:
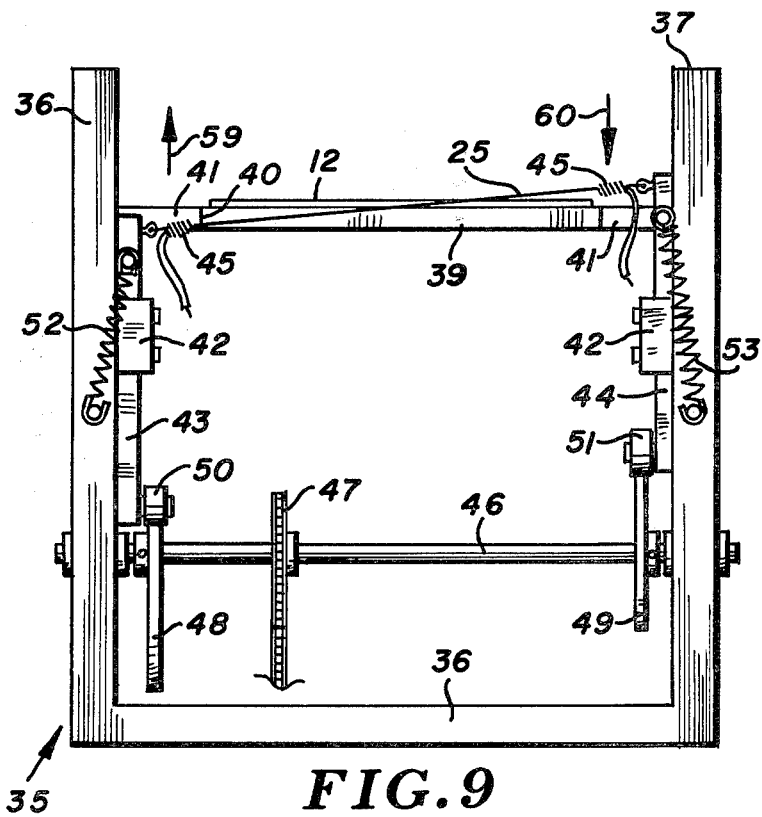
FIG. 9 is a front elevation of the arrangement of FIG. 8.

With attention now directed to the views of FIGS. 8 and 9, the orientation of the various parts when the cam shaft 46 is at its 180° shaft position is shown. At this point, the near side cam 48 has been rotated such that the follower shaft 43 is at the lowest point in its reciprocating travel and further rotation of the shaft in the direction of the arrow 54 will again cause the follower shaft 43 to move upward. This is indicated by the arrow 59 in FIG. 9. The far side cam 49 is at a position where continued rotation thereof in the direction of arrow 54 will continue to cause the follower shaft 44 to descend, this being indicated by the small arrow 60 in FIG. 9. Thus, as the shaft 46 continues to rotate between its 180° position and its 270° position, the respective ends of the hot-wire 25 will move in directions indicated by the arrows 59 and 60 respectively. The downward movement of the follower shaft 44 will then cause the hot-wire 25 to descend through the rightmost half of the web 12 as viewed in FIG. 9.

Figure 10:
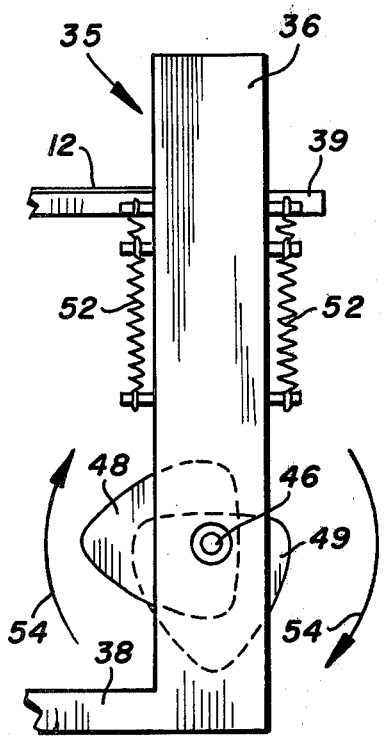
FIG. 10 is yet another side elevation of the hot-wire cutting apparatus at a still later point in its operating cycle.
Figure 11:
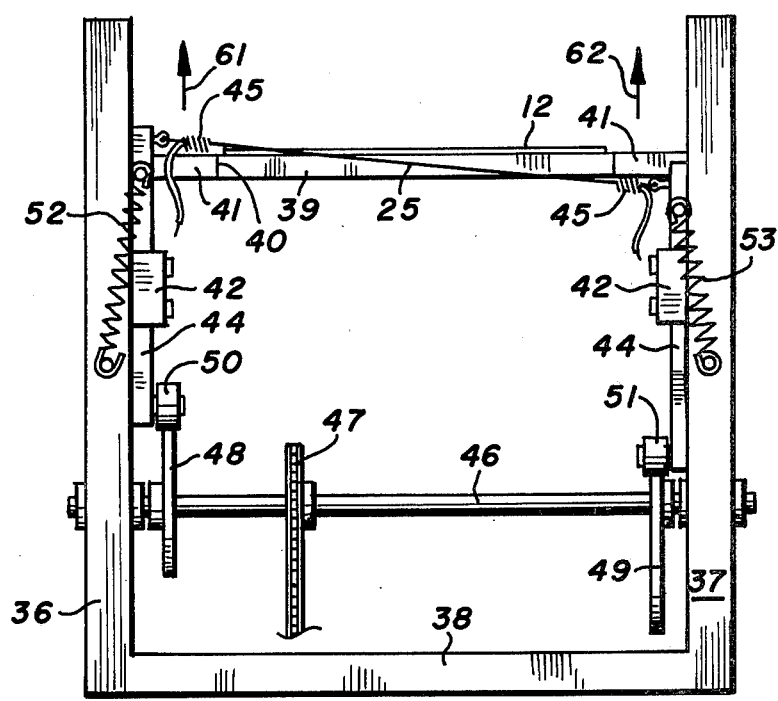
FIG. 11 is a front elevation of the device of FIG. 10.

At an angle between 180° and 270°, the near side and far side cam follower shafts will be at the same elevation such that the hot-wire 25 will be generally horizontal. At this moment, the level of the hot-wire 25 will be below the top surface of the platform 39 and the web may again be stepped by a distance, L, (FIG. 1) to bring a new tacked or bonded zone into alignment with the slot 40 formed in the platform 39. As the near side cam follower shaft 43 continues to rise, the leftmost end of the hot-wire 25 is the first to come into coaction with the superposed layers of thermoplastic material, as can best be seen in the views of FIGS. 10 and 11 which illustrates the positioning of the various parts when the shaft is at its 270° position. Here, the rightmost or far side cam follower shaft 44 is at the lowermost position in its travel and is about to again ascend. The near side cam 48 is already functioning to move the near side cam follower shaft 43 upward. Hence, the direction of motion of the ends of the hot-wire 25 during the 270° to 360° rotational interval is as illustrated by the arrows 61 and 62 in FIG. 11.

Figure 3:
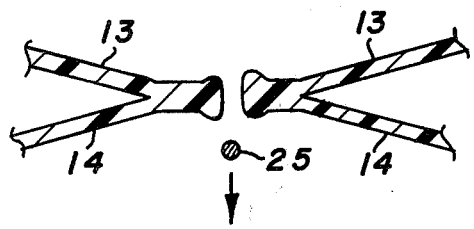
FIG. 3 is a cross-sectional view of FIG. 2 after the hot-wire has been made to pass through the tacked webs.

By noting the sequence of events as represented by FIGS. 6 through 11, then, it can be seen that during the downward movement of the hot-wire 25, it is the near side thereof which is first to contact and begin cutting the film layers 12. As the hot-wire continues to descend and pass through the film layers 12, the cut continues across the width dimension of the web until the rightmost or far side of the wire has progressed through the web. Immediately after passing through the web, the heat loss encountered by the rightmost end of the wire begins to recover and during the subsequent upward stroke of the wire, following indexing of the film to its new position, it is again the near side or leftmost end of the wire which is the first to come into contact with the film layer. Thus, it is always the portion of the hot-wire which has been out of contact with the film material for the longest interval which again comes into contact with the web during a subsequent cutting stroke. This ensures that the portion of the wire in contact with the film during the cutting stroke will be at a sufficiently elevated temperature to effect cutting of the web and simultaneous fusion or welding of the superposed layers in proximity to the path of the cut, all as is indicated in FIG. 3.

If the hot-wire 25 were merely oriented parallel to the film layer 12 and both ends thereof were moved downward in unison, constantly maintaining the parallel relationship, as the wire intersects with the web, its entire surface would be subjected to the cooling effect of the plastic with which it comes into contact. It would then be necessary to maintain the blade in an out of contact relationship with the film material for a sufficiently long time to allow appropriate re-heating to occur. This necessarily adds to the dwell time of the machine and therefore to the cutting time per bag. This decreases the overall throughput of the bag forming machine itself.

By utilizing the hot-wire manipulating mechanism of the present invention, the portion of the hot-wire which has already passed through the film layer is permitted to re-heat while the remaining portion of the hot-wire is still progressing through the film layer. The portion of the hot-wire which has been out of contact with the film layer for the longest time interval is then the first to again come into contact with the film on a subsequent cutting stroke. As such, the re-heating of the operative portion of the wire occurs during the cutting stroke itself and it is accordingly possible to step the film through the bag forming machine at a higher rate due to the fact that the dwell time needed for re-heating is effectively eliminated.

In implementing the invention, it has been found expedient to utilize an ATHENA Series 68 control system for energizing the hot-wire element 25. This device is manufactured and sold by Athena Controls, Inc. of West Conshohocken, Pa. That device senses incremental changes in the resistance of the metal alloy hot-wire occasioned by temperature changes and operates in a closed-loop control manner to adjust the current flowing through the hot-wire so as to maintain the wire temperature at a preset value.

The invention has been described herein in consierable detail, in order to comply with the Patent Statutes and to provide those skilled in the art with information needed to apply to novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. A machine for forming bags from thermoplastic film comprising, in combination:
    (a) supply means for dispensing continuous layers of superposed thermoplastic film sheet material in intermittent steps along a predetermined path;
    (b) means disposed in said path for forming a bond zone of a predetermined width between said superposed layers of sheet material at spaced apart locations along said path, said bond zone extending transverse to said path; and
    (c) cutting means disposed downstream of said last-mentioned means for making a transverse cut through the approximate center of said bond zone, said cutting means comprising:
        1. first and second reciprocally movable support members generally aligned with one another on opposite sides of said film path, 2. a hot wire element extending between said first and second support members and transverse to said film path, 3. means for driving said first and second reciprocally movable support members in a predetermined phase relationship whereby said hot wire is progressively passed through said bond zones from one side edge of said layers to the other with the portion of said hot wire first contacting said layers during the passage through one bond zone being the first to contact said layers during the passage through the adjacent bond zone.

2. Apparatus as in claim 1 and further including:
(a) means disposed transverse to said path and on opposite sides of said hot wire along said path for periodically clamping said layers.

3. Apparatus as in claim 2 and further including means for transporting the portion of said layers which is cut to a stacking station.

4. Apparatus as in claim 1 wherein said means for driving said first and second reciprocally movable support members comprises:
(a) a frame;
(b) an elongated shaft journaled for rotation in said frame;
(c) motor means coupled in a driving relationship to said shaft;
(d) first and second cams affixed to said shaft proximate opposite ends thereof, said cams having predetermined generally identical profiles with the maximum throw of said cams being offset 90° with respect to one another; and
(e) cam follower means coupling said first and second cams to said reciprocally movable support members.

5. Apparatus as in claim 1 wherein said hot wire element comprises a low expansion metal alloy having a positive temperature coefficient of resistance.

6. Apparatus as in claim 1 wherein said continuous layer of superposed thermoplastic sheet material comprise a continuous web of longitudinally folded sheet material.

7. Apparatus for cutting a continuous web of thermoplastic film material into discrete segments comprising:
(a) means for intermittently moving said web, step-by-step, along a predetermined path;
(b) a heated wire extending transverse to the web to be cut; and
(c) means for reciprocally moving the opposed ends of said heated wire in a predetermined phase relationship whereby said heated wire is progressively passed through said web while it is stationary from one side edge thereof to the other with the portion of said heated wire first contacting said web during a first passage therethrough being the first to contact said web during the next subsequent passage through said web, after said web has been advanced another step.

* * * * *

UNITED STATES PATENT AND TRADEMARK OFFICE
CERTIFICATE OF CORRECTION

PATENT NO. : 4,319,952
DATED : March 16, 1982
INVENTOR(S) : Gilmore T. Schjeldahl It is certified that error appears in the above-identified patent and that said Letters Patent are hereby corrected as shown below:

Column 10, Line 10, the word "layer" should read -- layers --.

Signed and Sealed this

Twenty-fifth Day of May 1982

[SEAL]

Attest:

GERALD J. MOSSINGHOFF

*Attesting Officer*     *Commissioner of Patents and Trademarks*